Feb. 14, 1950
J. R. MACINTYRE ET AL
2,497,678
MAXIMUM DEMAND METER RESET MECHANISM
Filed Feb. 10, 1948
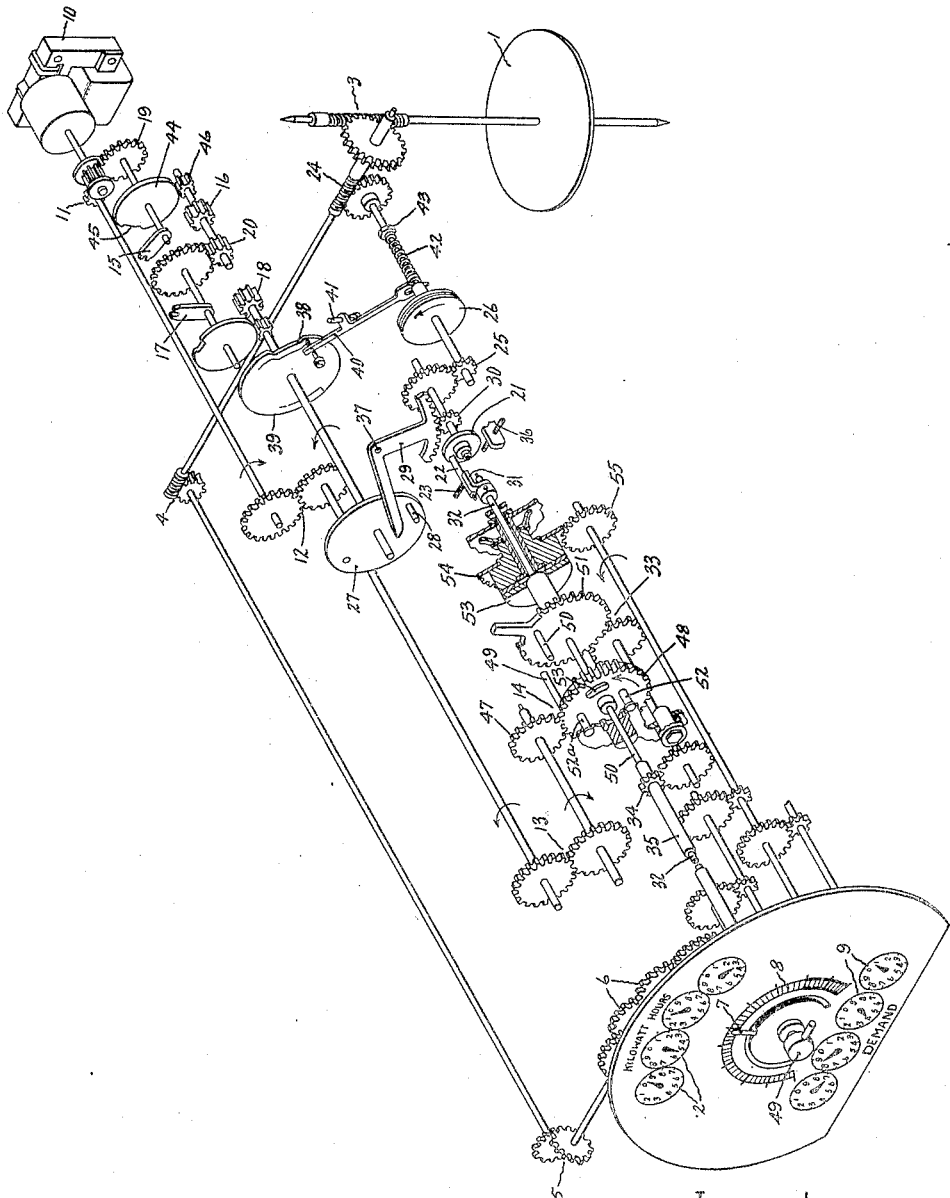
Inventors:
John R. Macintyre,
Robert L. Davis,
by *Pravell S. Mack*
Their Attorney.

Patented Feb. 14, 1950

2,497,678

UNITED STATES PATENT OFFICE 2,497,678

MAXIMUM DEMAND METER RESET MECHANISM

John R. Macintyre, South Peabody, and Robert L. Davis, Saugus, Mass., assignors to General Electric Company, a corporation of New York Application February 10, 1948, Serial No. 7,438

5 Claims. (Cl. 171—34)

Our invention relates to maximum demand meters of the block interval type and in particular to the reset timing mechanism thereof, and its object is to provide a relatively simple, reliable, long-life reset timing mechanism which performs its resetting operation accurately and quickly. In carrying our invention into effect, we employ Geneva gearing for the dual purpose of determining the timing interval and resetting the pointer pusher to zero. This provides a positive drive through the reset mechanism without the use of an energy storage spring or its equivalent, and results in a low average load and a long life for the timing motor. Also no energy is taken from the meter for resetting operations.

The features of our invention which are believed to be novel and patentable will be pointed out in the claims appended hereto. For a better understanding of our invention reference is made in the following description to the accompanying drawing showing a perspective, exploded view of watthour demand meter mechanism to which our invention has been applied.

Referring to the drawing, 1 may be taken to represent the rotor disk of an induction watthour meter. This meter drives a kilowatt-hour register at 2 through gears at 3, 4, 5 and 6 to register the total kilowatts consumed by the meter.

Below register 2 is a maximum demand pointer 7 which registers the maximum watthour consumption of meter 1 on a scale 8 during predetermined time intervals such, for example, as fifteen minutes or one-half hour. In describing our invention, we will assume a 60-minute demand interval. This pointer is reset to a zero position generally at the end of each month after the maximum demand reading has been recorded by a meter reader. Beneath the maximum demand pointer and scale is an accumulative demand register 9 on which a summation of the maxmium demand readings is registered. The register 9 is advanced only when the maximum demand pointer 7 is reset to zero. An accumulative demand meter of this general character is described and claimed in United States Patent No. 2,006,321—June 25, 1935.

Shown at the upper right of the drawing is a timer motor 10 which may be an alternating current synchronous motor of the type used for driving clocks. This motor is used in establishing the demand measuring timing interval, and in performing the 60-minute interval resetting operation, and also is used for resetting the maximum demand pointer 7 and adding its reading to the accumulative register 9 at the end of the month. The monthly resetting operation is performed through gear train 11, 12, 13, 14, and the 60-minute interval period is established and the 60-minute interval resetting operation is performed through a multiple unit Geneva gear train 15, 16, 17, 18, and gears at 19 and 20 interconnecting the Geneva gears with the motor and with each other.

The demand meter dog part which is reset to a zero position every sixty minutes is represented as comprising a disk 21 having a pin 22 therein and an adjustable screw 23 threaded through pin 22. This part is advanced in a clockwise direction by the meter 1 through gearing at 24 and 25 and a friction clutch at 26 in accordance with the demand to be measured. It is reset to zero in a counterclockwise direction by motor 10 through the Geneva gear timing interval mechanism which includes a disk 27 having a pin 28 therein which actuates a gear sector lever 29 meshing with a gear 30 on the shaft of dog 21. When the dog pin 23 is advanced by the meter, it may engage and drive a cooperating dog arm 31 fixed on the shaft 32. Shaft 32 is in driving relation with demand pointer 7 through the gears at 33 and 34 and hollow shaft 35. The maximum demand pointer 7, its driving arm 31, dog 21, and the connected gear sector 29 of the reset mechanism are shown in approximately what may be considered the one-half full scale position with pin 23 in driving contact with arm 31. The zero or reset position of dog disk 21 is with its pin 22 rotated counterclockwise from the position shown against an adjustable zero stop 36. This resetting operation is accomplished by the rotation of disk 27 counterclockwise during a one-fourth revolution movement from approximately the position shown. During such movement pin 28 engages the tail of gear sector lever 29 and moves it up and to the right. The lever rotates clockwise about its pivot at 37, and its gear sector rotates gear 30 and the dog to zero position as pin 28 clears and moves by the tail of lever 29. While the zero reset parts are positively reset quickly, there is nothing resembling a hammerblow effect that would cause rebound to error. The parts arrive at the zero position while decelerating because the tail of the lever 29 which is contacted by pin 28 is sloped off and the lever is otherwise shaped and pivoted to provide a precision zero setting without shock.

During any such resetting action a cam at 38 on a disk 39 engages a lever 40 pivoted at 41 and swings it to disengage the clutch 26 between the meter and demand dog. Hence, the only load required in moving lever 29 during a resetting operation is that necessary to overcome the friction of the parts geared thereto when the clutch 26 is open. This clutch is normally held closed by a light spring 42 having an adjustable tensioning nut 43. In practice the cam disk 39 and pin disk 27 will generally comprise a single unitary part but are here shown as separate for clearness in the illustration.

Associated with each Geneva gear unit is a locking device for preventing rotation of the driven part except when advanced by the Geneva gear. Thus, on the shaft with Geneva gear sector 15 is a disk 44 having a cutout sector 45, and on the shaft with gear 16 is a locking gear 46. The raised peripheral portion of disk 44 when adjacent locking gear 46 prevents rotation thereof; but when the gear 16 is to be driven by sector 15, the cutout part 45 of disk 44 is adjacent locking gear 46 and allows it to rotate by giving clearance to a tooth therein. In the present illustration gear 16 has eight teeth and gear 46 has four teeth, and these parts rotate one-fourth revolution each time sector 15 engages and drives gear 16.

Two Geneva gear units are represented. However, the number of these units and the driving ratios employed may vary with different demand timing intervals. The second Geneva gear unit illustrated is similar to the one described. In a 60-minute demand interval mechanism the motor 10 may have a terminal shaft speed of one revolution per minute and use gearing at 19 so as to drive the parts 15, 19, 44 at two-thirds revolution per minute. Hence, sector 15 will make one revolution every one and one-half minutes. Sector 15 advances gear 16 two teeth or one-fourth revolution every one and one-half minutes and during approximately $\frac{1}{10}$ revolution of the driving part 15, and hence, gear 16 will require six minutes for a complete revolution. An eight-toothed pinion at 20 meshes with a 20-tooth gear which drives sector 17. Hence, gear sector 17 will require $$\frac{20}{8} \times 6 = 15$$

minutes to make a complete revolution, and hence, will rotate the gear 18 and disks 27 and 39 one-fourth revolution once every fifteen minutes. Also, sector 17 rotates in motion impulses or steps of one-tenth revolution each, which is sufficient to completely drive gear 18 one-fourth revolution in one such step. The time duration of each such impulse is the same as the time duration during which gear 16 is advanced one-fourth revolution, or approximately $\frac{1}{10} \times 1\frac{1}{2}$ minutes = 9 seconds. Moreover, the camming action between pin 28 and the tail of lever 29 is such that a complete resetting action for a full scale maximum demand position of lever 29 will occur in somewhat less than ¼ revolution of disk 27. Hence, the actual demand interval resetting time is a maximum of nine seconds out of a 60-minute interval, or one-fourth of one per cent of the time.

This is important for two reasons: (1) High accuracy in that the demand is being measured 99¾ per cent of the time and no energy is taken from the meter 1 for resetting purposes. (2) Low average load on the timing motor. Thus, for 99¾ per cent of the time the load on motor 10 corresponds to that necessary to drive the idle Geneva gear train, and the remaining time its load is comparable to that encountered in previous maximum demand meters where the motor furnishes the energy for resetting, usually by storing energy in a spring or weight. It is to be noted that during a resetting operation, clutch 26 is disengaged so that even then the actual motor load is not excessive. Hence, the motor and demand interval mechanism will have small wear and a long life corresponding to the low load thereon.

The timing interval mechanism is fairly simple, may be made of simple rugged parts, and provides a direct drive to the reset dog while serving the purpose of a gear reduction and for establishing the timing interval. The mechanism is readily changed for different demand measuring periods. For example, adding another pin 28 and cam 38, 180 degrees from those shown, will provide a 30-minute demand measurement interval. Provision is made for these extra attachments. Using a one to one gear ratio at 20 will provide a 24-minute interval mechanism. Eliminating the second Geneva gear unit and driving disks 27 and 39 from sector 15 will provide a six-minute demand interval mechanism etc. It is important that the number of motion impulses or advancing steps of each Geneva gear which occurs during the demand period selected be integers, and that one of such motion impulse advancing steps be sufficient to completely operate the reset mechanism.

It is to be understood that the meter 1 advances the dog parts 21 during a 60-minute period, advancing the arm 31 and demand pointer 7 if they are not already advanced in proportion to the demand for such period. Then dog 21 is reset to zero while arm 31 remains where it is. During the next period the operation is repeated and in case the demand is greater, demand pointer 7 is advanced further. These operations continue during a period of a month and at the end of such month, pointer 7 indicates the maximum 60-minute demand that has occurred during such month. This is recorded, the demand pointer 7 and arm 31 are then reset to zero, and the maximum demand reading is added to the accumulative demand register 9.

The apparatus for resetting the demand pointer 7 and adding its reading to register 9 is essentially the same as that described in Patent No. 2,006,321, but will be briefly reviewed herein. The gear 47 is continuously driven by the timer motor 10 through gearing 12, 13, gear 47 rotating in a clockwise direction. Normally, gear 47 is out of mesh with a gear 48. However, when the demand pointer 7 is to be reset, the knob 49 on the front of the dial is pushed inwardly by the meter reader. This moves a shaft 50 endwise against a spring, not shown, and gear 48 with it a small amount so as to mesh gear 48 with rotating gear 47. This is the condition of the gears as represented. Gear 48 now rotates in a counterclockwise direction. A pin 49 on its rear face engages and drives a pin 50 on gear 51. Gear 51 is in driving relation with demand pointer 7 through the gears at 33 and 34 and hollow shaft 35, and has a position before being reset which corresponds to the maximum demand measurement. When knob 49 is pushed inward to intermesh gears 47 and 48, gear 48 is rotatively positioned so that a pair of stationary pins 52 and 52a are aligned with a pair of slots of gear 48, one of which is shown at 53. The pushing-in operation disengages these slots and pins, allowing gear 48 to be driven and as soon as the slots 53 are out of alignment with the pins 52, the push button 49 may be released since the gear 48 will be held in the pushed-back position by reason of the pins 52 and 52a riding on the face of gear 48 until the gear completes one revolution, since the diametrically opposite pins and slots are at different radii. When gear 48 has made one complete revolution, the pins again enter their slots and this resetting operation is complete. Gear 48 has a few of its gear teeth extended to the rear so as to mesh with gear 47 after the gear 48 has returned forward for the purpose of properly completing the operation before the gears run out of mesh.

When knob 49 is pushed to the rear, a friction clutch at 53 is engaged which places gear 51 in driving relation with a gear 54 which meshes with a gear 55 in driving relation with the totalizing register 9, so that this register is advanced by the same amount that gear 51 is reset in returning the demand pointer 7 to zero position. This resetting operation may also be performed manually by turning knob 49 counterclockwise by hand one complete revolution after being pushed inwardly. There is an overrunning clutch, not shown, in the drive train of motor 10 which permits this. The resetting of demand pointer 7 either by motor 10 or manually also resets the 15-minute interval dog parts at 21 to zero position, the clutch at 26 slipping for this purpose.

In the illustration the parts have been spread apart considerably and extra shafting illustrated for the purpose of clarity. In actual practice the mechanism is made very much more compactly than the illustration would indicate. For example, gears 20, 16 and 46 are a single unit and the tail of lever 29 engaged by pin 28 is shorter. Certain adjustments and refinements unnecessary for an understanding of the invention and its inclusion in the combination have been omitted.

What we claim as new and desire to secure by Letters Patent of the United States is:

1. A demand meter comprising a demand measuring part, means for advancing said part from a zero position in accordance with the demand to be measured, means for resetting said part to a zero position, a timer motor, and a plurality of Geneva gears in series driving relation between said motor and resetting means through which said resetting means and part periodically are directly driven to a zero position by said timer motor.

2. A demand meter comprising a demand measuring part, a meter for advancing said part in accordance with the demand to be measured, a normally engaged releasable clutch between said meter and demand measuring part through which said demand measuring part is advanced, means for releasing said clutch, means for resetting said part to a zero position, a timer motor, and Geneva gearing between said motor and the clutch releasing and part resetting means through which periodically said clutch is released and said resetting means and part are driven directly by said motor to zero position while the clutch is released.

3. A demand meter comprising a demand measuring part, means for advancing said part from a zero position in accordance with the demand to be measured, means for resetting said part to a zero position, a timer motor, and a plurality of Geneva gears connected in series driving relation between said motor and resetting means for periodically directly driving said resetting means and part to a zero position, said resetting operation being completed during a single motion impulse of all of said Geneva gears, the number of motion impulses made by each Geneva gear between resetting operations being integers.

4. A demand meter comprising a demand measuring part adapted to be advanced during a demand measuring time interval in accordance with the demand to be measured, a normally engaged releasable clutch through which said demand measuring part is advanced, means for releasing said clutch and means for resetting said demand measuring part to a zero position, a timer motor, two Geneva gear units in series driving relation between said motor and said clutch releasing and resetting means, the continuous rotary motion of the timer motor producing a considerable number of periodic forward motion driving impulses through the first Geneva gear unit and a lesser number of periodic forward motion driving impulses through the second Geneva gear unit during a demand measuring interval, said clutch releasing and resetting operations being completely performed by direct drive from said motor through said Geneva gears at the end of said demand measuring interval during one of said forward motion driving impulses.

5. In a demand meter, a reset mechanism, a constant speed timer motor and time interval establishing driving means between said motor and reset mechanism for directly operating the latter from the motor at the end of demand measuring time intervals established thereby, comprising a pair of similar Geneva gear units in series driving relation each having driving and driven parts, the driving parts rotating the driven parts one-fourth revolution during approximately one-tenth revolution of the driving part, the driving part of the first Geneva gear unit being driven by said motor at two-thirds revolution per minute, a 2:5 gear reduction between the driven part of the first Geneva gear and the driving part of the second Geneva gear whereby the driven part of the second Geneva gear is advanced one-fourth revolution every fifteen minutes during approximately a nine-second time interval, said resetting mechanism being completely operated by the driven part of the second Geneva gear during one such one-fourth revolution.

JOHN R. MACINTYRE.
ROBERT L. DAVIS.

REFERENCES CITED

The following references are of record in the file of this patent:

UNITED STATES PATENTS

| Number | Name | Date |
|---|---|---|
| 1,456,104 | Hall | May 22, 1923 |